United States Patent [19]

Adler

[11] 4,011,551
[45] Mar. 8, 1977

[54] MULTIPLE DATA CHANNEL WIRELESS DATA COUPLING SYSTEM FOR TRANSMITTING MEASURED DATA FROM A PLURALITY OF ROTATING SOURCES

[75] Inventor: Alan J. Adler, Palo Alto, Calif.
[73] Assignee: Acurex Corporation, Mountain View, Calif.
[22] Filed: Feb. 23, 1976
[21] Appl. No.: 660,070
[52] U.S. Cl. .................. 340/189 M; 340/184; 340/207 R
[51] Int. Cl.² .................................. G08C 19/16
[58] Field of Search ............... 340/189 M, 184
[56] References Cited

UNITED STATES PATENTS

| | | | |
|---|---|---|---|
| 2,494,370 | 1/1950 | Swartzel | 340/184 |
| 3,268,880 | 8/1966 | Miller | 340/189 M |
| 3,303,701 | 2/1967 | Matsuura | 340/189 M |

Primary Examiner—Thomas B. Habecker
Attorney, Agent, or Firm—Flehr, Hohbach, Test, Albritton & Herbert

[57] ABSTRACT

A multiple data channel wireless data coupling system which transmits measured data from a plurality of rotating data sources to a stationary receiver. It includes several rotating transmitters, each producing a unique carrier frequency, which are capacitively coupled to a stationary receiver. The transmitters are supplied power from a relatively low frequency power source through an inductive coupling. The low frequency power source is also utilized to synchronize all of the transmitters as well as the receiver.

7 Claims, 9 Drawing Figures

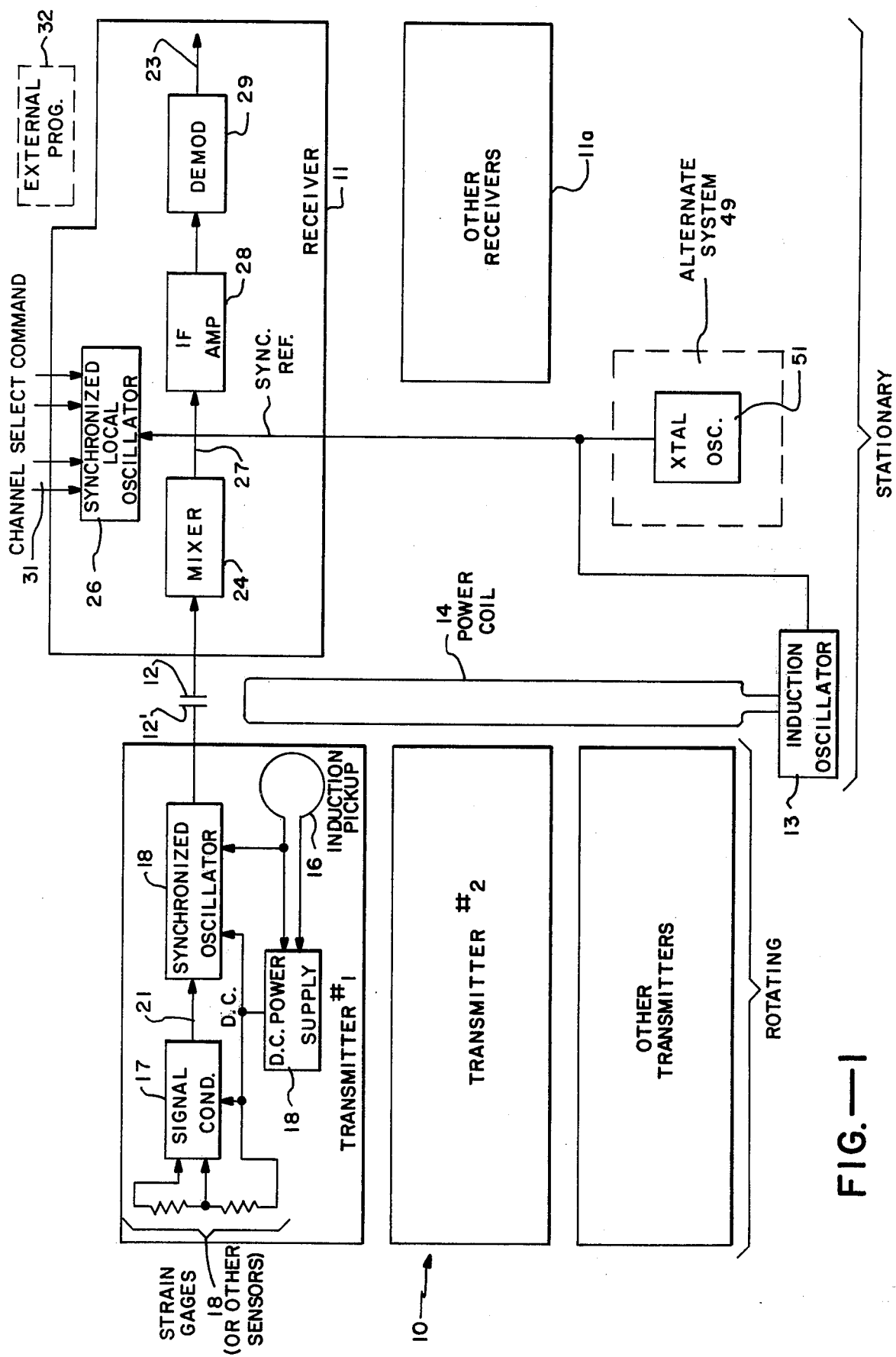
FIG.—1

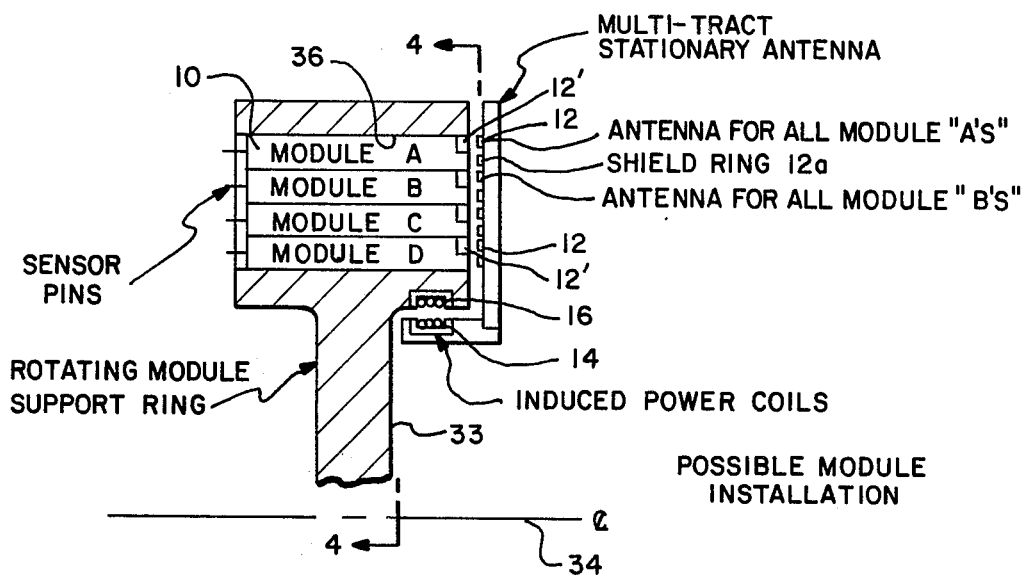
FIG.—2
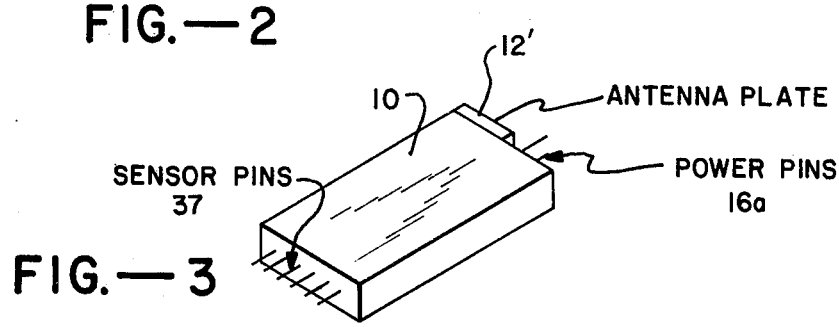
FIG.—3
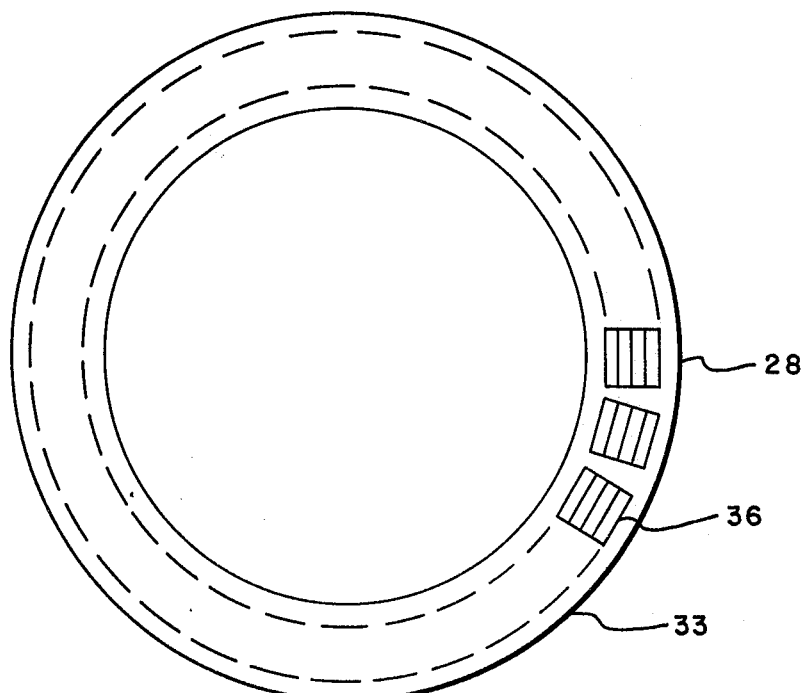
FIG.—4

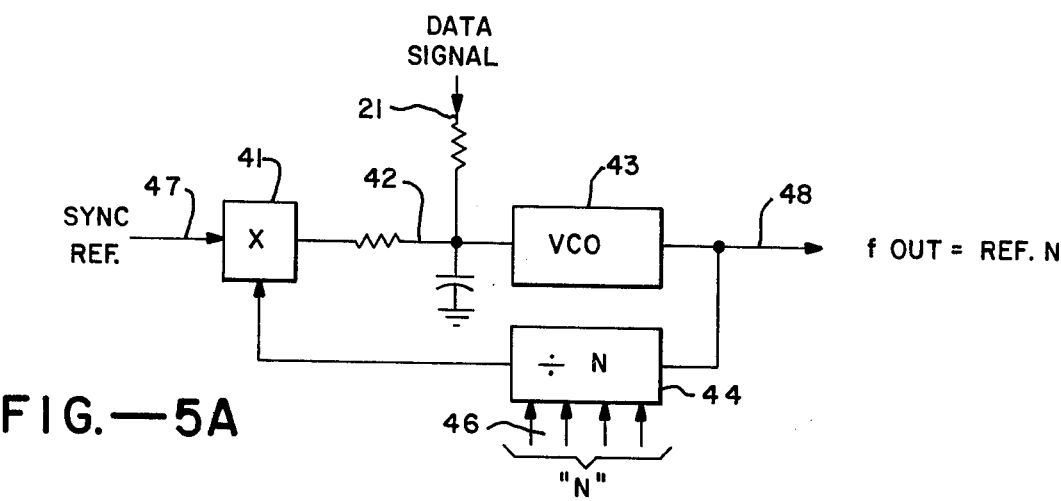
FIG.—5A
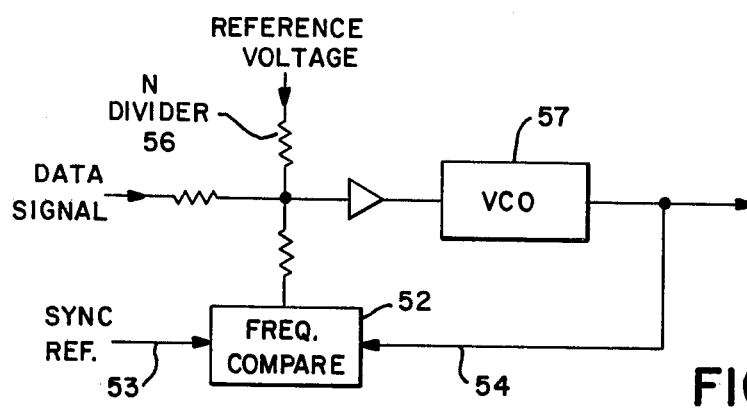
FIG.—5B
| CHANNEL NUMBER | TRANSMITTER | | RECEIVER | |
|---|---|---|---|---|
| | TRANS-MITTER | "N" (ASSUMES REF.=.5MHZ) | LOCAL OSC (10MHZ IF) | "N" |
| 1 | 15 MHZ | 30 | 25 MHZ | 50 |
| 2 | 15.5 | 31 | 25.5 | 51 |
| 3 | 16.0 | 32 | 26.0 | 52 |
| • | • | • | • | • |
| • | • | • | • | • |
| • | • | • | • | • |
| 25 | 27.0 | 54 | 37.0 | 74 |
| 26 | 27.5 | 55 | 37.5 | 75 |
| 27 | 28.0 | 56 | 38.0 | 76 |
| 28 | 28.5 | 57 | 38.5 | 77 |
FIG.—6

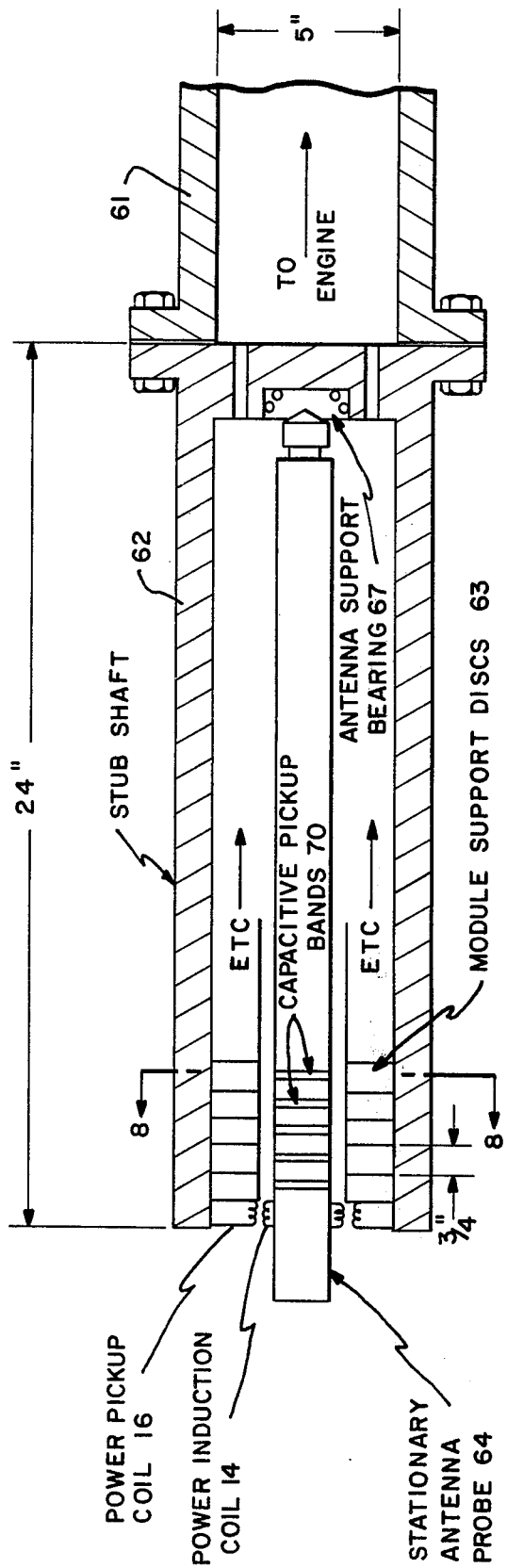
FIG.—7
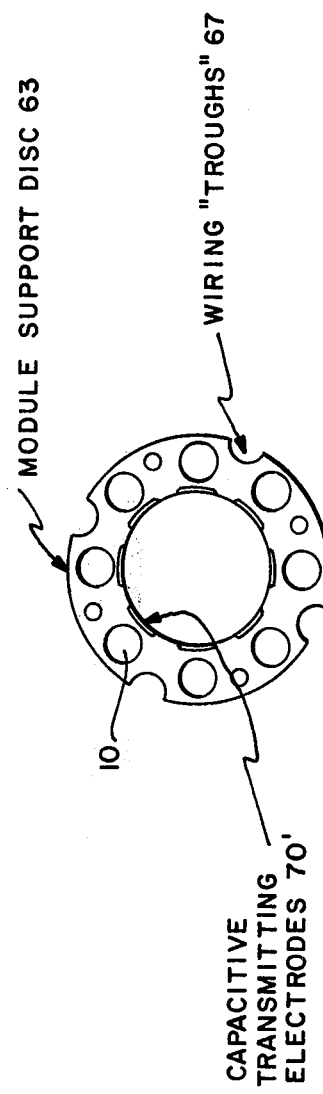
FIG.—8

MULTIPLE DATA CHANNEL WIRELESS DATA COUPLING SYSTEM FOR TRANSMITTING MEASURED DATA FROM A PLURALITY OF ROTATING SOURCES

BACKGROUND OF THE INVENTION

The present invention is directed to a multiple data channel wireless data coupling system for transmitting measured data from a plurality of rotating sources. More specifically each data channel has a unique carrier frequency which is modulated by a data source signal.

Wireless data coupling systems are well known as shown by U.S. Pat. No. 3,850,030 and 3,909,811 both of which are in the name of the present inventor and assigned to the present assignee. U.S. Pat. No. 3,909,811 is an example of a single channel multiplexed system. Where multiple data channels are desired separate carrier frequencies have been provided by the use of LC tuned oscillators. However, these are subject to drift necessitating a large frequency difference between channels and therefore fewer channels.

A relatively large number of data channels have been provided in a wired system by slip rings but there are problems of wear and convenient mechanical placement.

OBJECTS AND SUMMARY OF THE INVENTION

It is, therefore, a general object of the invention to provide a multiple data channel wireless data coupling system for transmitting measured data from a plurality of rotating sources.

It is another object to provide a system as above which has a large channel capacity with frequency stability and accuracy.

In accordance with the above objects there is provided a multiple data channel wireless data coupling system for transmitting measured data from a plurality of rotating sources producing data source signals to a stationary receiver. A stationary low frequency power source is provided. A plurality of high frequency transmitter means each correspond to one of the plurality of rotating data sources and are mounted for rotation therewith. Each transmitter means includes oscillator means for generating a unique high frequency carrier signal to provide one of the data channels. Means are provided for modulating the carrier signal with a corresponding data source signal. The oscillator means has a reference input for determining the unique carrier frequency. Coupling means are provided for coupling the stationary low frequency power source to all of the rotating reference inputs. Demodulating means are included in the stationary receiver for receiving the plurality of modulated carrier signals and for demodulating the signals to provide the data source signals. Wireless coupling means couple the demodulating means to the transmitter means.

BRIEF DESCRIPTION OF THE DRAWINGS

FIG. 1 is a block diagram embodying the present invention;

FIG. 2 is a cross-sectional view of a portion of FIG. 1;

FIG. 3 is a perspective view of one of the modules of FIG. 2;

FIG. 4 is a completed cross-sectional view taken along lines 4—4 of FIG. 2;

FIGS. 5A and 5B are alternative circuit block diagrams of portions of FIG. 1;

FIG. 6 is a table useful in understanding the invention; FIG. 7 is a cross-sectional view of an alternative embodiment of the invention; and FIG. 8 is a cross-sectional view taken substantially along the line 7—7 of FIG. 7.

DETAILED DESCRIPTION OF THE PREFERRED EMBODIMENT

FIG. 1 illustrates a multiple data channel wireless data coupling system having several transmitters 10; i.e., one for each data channel and at least one stationary receiver 11. Other receivers are indicated by block 11a and may correspond to transmitters on a one-to-one basis. Alternatively, receiver 11 may receive all transmitted signals on a time division multiplex basis.

The transmitters 10 would be mounted on rotating machinery and coupled by capacitive coupling means to the stationary receiver portion of the system. The relatively high frequency capacitive coupling for one of the data channels is indicated at 12.

A stationary low frequency power source or induction oscillator 13 is inductively coupled to all of the rotating transmitters by means of a stationary power coil 14 which couples to the rotating inductive pickups 16 which are a portion of each transmitter 10. Alternatively a single rotating pickup can power a plurality of transmitters. The oscillator frequency or the lower power frequency is, for example, the order of magnitude of 0.5 megahertz as compared to the data channel frequency which is an order of magnitude higher; for example, on the order of 25 megahertz.

Each transmitter includes a signal conditioner unit 17 which is coupled to a strain gauge bridge 18 which is well known in the art which is mounted on a portion of the rotating machinery which is being tested. Of course, the test could include thermocouples or other sensing indicators could be equally substituted. DC power supply 18 rectifies the relatively low frequency alernating current from induction pickup 16 to supply power to all of the units of the transmitter. This includes a synchronized oscillator 19 which produces a unique carrier frequency which is modulated by the input on line 21 from signal conditioner 17. The oscillator is synchronized to produce a predetermined carrier frequency by a reference input line 22 which is connected to the induction pickup 16.

All of the remaining transmitters have identical components as transmitter number one and have their own unique carrier frequency which is predetermined by a modification of the oscillator 19 which will be discussed below.

The modulated high frequency carrier signal is transmitted to the stationary receiver 11 by means of the capacitive coupling unit 12, 121 and demodulated to reproduce at the output 23 the original signal produced by the strain gauges 18. Receiver 11 is a superheterodyne arrangement which includes a mixer 24 for receiving the modulated carrier signal (which would typically be FM modulated) and a synchronized local oscillator 26 connected to the mixer to provide an intermediate frequency (IF) signal on line 27 which is coupled to IF amplifier 28 and thereafter to FM demodulator unit 29 which has as its output line 23.

Local oscillator 26 is programmable with channel select input commands 31 either in a fixed or variable manner. Specifically, in some applications when the transmitter and receivers are to operate on a one per one basis, the frequency of the local oscillator is fixed. However, if only one receiver is used for several transmitted carrier frequencies, an external programmer 32 programs by means of channel select command inputs 31 the local oscillator to provide a time division multiplex operation.

The physical orientation of the transmitter units 10 is more clearly shown in typical application in FIGS. 2, 3 and 4. This illustrates a jet engine testing application. FIGS. 2 and 4 indicate a rotating module support ring 33 which would be mounted on the shaft 34 of a jet engine and which has 28 recessed cavities 36 which each accept 4 transmitter modules designated A, B, C and D. Each transmitter module has a separate capacitive coupling means in the form of a conductive ring 12 along with an associated shield ring 12a and a common power frequency induction pickup system 14, 16. FIG. 3 is a single transmitter module 10 with its antenna plate 12', which are ring sectors spaced opposite fixed ring 12, power pins 16a which are coupled to the induction pickup 16 and sensor pins 37 which would be coupled to the strain gauges 18 as illustrated in FIG. 1.

Thus, in the foregoing applicaton with 28 recessed cavities, 28 different channels for each module may be provided each with its unique carrier frequency to thus provide a total of 4 times 28 or 112 data channels. This is greatly in excess of the practical number of data channels for a system which utilizes individual LC tuned transmitters which are, of course, as discussed above subject to drift and thus channel to channel interference.

The synchronized oscillator 19 (FIG. 1) and synchronized local oscillator 26 may be constructed as shown in FIG. 5A. In general this is a phase locked loop having a comparator 41, low pass filter 42, voltage controlled oscillator (VCO) 43 and a frequency divider 44 which has programmable inputs 46. A synchronizing reference is one input 47 to comparator 41 and the divided VCO output the other. The VCO output is also on line 48.

In the case of synchronized oscillator 19 (FIG. 1), the sync reference would occur on line 22 from the induction pickup 16. Moreover, the data signal is received on line 21 and also coupled to the input of VCO 43.

In the case of the synchronized local oscillator 26 in the stationary receiver the sync reference on line 47 is in the preferred embodiment obtained from the induction oscillator 13 and therefore is of the identical frequency as is obtained by induction pickup 16. Alternatively, as shown by the designation alternate system in block 49, the sync reference is obtained from a crystal oscillator 51.

Finally, as also illustrated in FIG. 1, the channel select command inputs 31 would be the "N" inputs 46 designated in FIG. 5A. Where the receivers and transmitters are on a one-for-one basis, the inputs are permanently strapped to a fixed binary input state. Where the receiver is used on a time division multiplex basis and therefore coupled to the external programmer 32, the programmer is sequentially programmed to provide unique "Ns" to provide successive different local oscillator signals. The final output on line 48 is, of course, the divisor "N", provided by frequency division unit 44, multiplied by the frequency on the synchronizing reference input 47. The frequency synthesizer of FIG. 5A is per se known in the art; that is, a phase locked loop which utilizes a frequency divider is, for example discussed in an *RCA Digital Integrated Circuits Application Note ICAN*-6101 which is entitled "The RCA COS/MOS Phase-Locked-Loop; A Versatile Building Block for Micro-Power Digital and Analog Applications" which was printed in October, 1972. Another commercially available digital frequency synthesizer of the same type is produced by the Hughes Aircraft Company under a designation HCPR0320. However, both of the foregoing commercially available digital frequency syntheziers could require some modification depending on the desired frequency range and type of ambient condition.

FIG. 5B illustrates an alternative type of oscillator to FIG. 5A where a frequency comparison unit 52 compares the sync reference input on line 53 to a VCO output on line 54. A resistive divider unit 56 which receives both the dc reference voltage and data signal drives the input of the VCO 57. Depending on the frequency desired the divider unit 56 would be accordingly proportioned.

FIG. 6 is a frequency table illustrating the typical operation of a system having 28 data channels. In the transmitter portion the transmitter frequencies are indicated starting at 15 megahertz and extending to 28.5. For the phase locked loop type of oscillator the channel select inputs of the oscillator designated "N", assuming the reference sync frequency of 0.5 megahertz, divide by 30 through 57.

The receiver, since it operates as a superheterodyne, is assumed to have an intermediate frequency of 10 megahertz. Moreover, it is assumed to operate on a difference subtractive basis and therefore, the local oscillator has a frequency 10 megahertz higher than the incoming carrier frequency. Thus, the range of local oscillator frequencies is is 25 to 38.6 megahertz with the channel select command "N" ranging from 50 to 77. As is apparent, by the use of the programmable divide by "N" frequency dividers in the transmitter portion of the system each unique carrier frequency is an integral multiple of the reference frequency which is produced by the induction oscillator 13. Thus, each transmitter has a reliable and fixed carrier frequency which will not drift. Therefore, relatively more data channels may be provided compared to prior systems and the system itself operates more reliably. In the case of the receiver portion in the preferred embodiment, utilizing the same low frequency signal from the power source 13 as the synchronizing reference to the local oscillator also provides improved operation. However, as illustrated in FIG. 1 in some applications a crystal oscillator system may be used to synchronize the local oscillator since the crystal is in a stationary, less severe ambient environment.

FIGS. 7 and 8 indicate an alternative mounting construction for the system of the present invention where a shaft end 61 from the engine or rotating machinery tested in available. Attached to shaft end 61 is a stub shaft 62 which by means of several module support discs 63, are mounted for rotation with shaft 62 provide 8 transmitter modules as shown in FIG. 8 per module support disc 63. Capacitive type pickup rings or bands 70 on a stationary antenna probe 64 provide for capacitive coupling of the modulated carrier frequency from rotating band sectors 70' each associated with an individual transmitter module. Similar power coil and inductive pickup coils 14, 16 are used for the low frequency power source signal. Wiring troughs 66 are provided in the disc 63. The stationary antenna probe 64 is mounted by means of an antenna support bearing unit 67 to the stub shaft 62.

Thus, an improved multiple channel data unit has been provided which has large channel capability with frequency reliability and accuracy.

What is claimed is:

1. A multiple data channel wireless data coupling system for transmitting measured data from a plurality of rotating sources producing data source signals to a stationary receiver comprising: a stationary low frequency power source; a plurality of high frequency transmitter means each corresponding to one of said plurality of rotating data sources and mounted for rotation therewith each of said transmitter means including oscillator means for generating a unique high frequency carrier signal to provide one of said data channels and including means for modulating said carrier signal with a corresponding data source signal, said oscillator means having a reference input for determining said unique carrier frequency; coupling means for coupling said stationary low frequency power source to all of said rotating reference inputs; demodulating means included in said stationary receiver for receiving said plurality of modulated carrier signals and for demodulating such signals to provide said data source signals; and wireless coupling means for coupling said demodulating means to said transmitter means.

2. A system as in claim 1 where said demodulating means includes a reference input means connected to said stationary power source for synchronizing said demodulation of said plurality of modulated carrier signals.

3. A system as in claim 1 where each of said oscillator means includes a phase locked loop comprising a comparator, voltage controlled oscillator (VCO), low pass filter, and a programmable frequency divider network connected between said VCO and said comparator said network dividing the output frequency of said VCO which provides said unique carrier frequency to match the low frequency power source which is the other input to said comparator each of said divider networks being programmed to provide a unique divisor.

4. A system as in claim 1 where said demodulating means includes a plurality of phase locked loops each comprising a comparator, low pass filter and voltage controlled oscillator (VCO) and a programmable frequency divider network said network programmed to provide a unique divisor for demodulating each of said carrier signals.

5. A system as in claim 1 where said demodulating means includes a single phase locked loop comprising a comparator, low pass filter, and voltage controlled oscillator (VCO) and a programmable frequency divider network; and means for programming said network sequentially to provide a unique divisor for sequentially demodulating each of said carrier signals.

6. A system as in claim 1 where said wireless coupling means includes a fixed ring and a plurality of rotating ring sectors spaced opposite said fixed ring each sector being connected to one of said plurality of high frequency transmitter means.

7. A multiple data channel wireless data coupling system for transmitting measured data from a plurality of rotating sources producing data source signals to a stationary receiver comprising: a stationary low frequency power source; a plurality of high frequency transmitter means each corresponding to one of said plurality of rotating data sources and mounted for rotation therewith each of said transmitter means including oscillator means for generating a unique high frequency carrier signal to provide one of said data channels and including means for modulating said carrier signal with a corresponding data source signal, coupling means for coupling said stationary low frequency power source to transmitter means; demodulating means included in said stationary receiver for receiving said plurality of modulated carrier signals and for demodulating such signals to provide said data source signals; and wireless capacitive coupling means for coupling said demodulating means to said transmitter means including a fixed ring and a plurality of rotating ring sectors spaced opposite said fixed ring each sector being connected to one of said plurality of high frequency transmitter means.

* * * * *